United States Patent [19]

Kenyon

[11] 3,851,317

[45] Nov. 26, 1974

[54] DOUBLE DENSITY NON-VOLATILE MEMORY ARRAY

[75] Inventor: Richard Arthur Kenyon, Underhill, Vt.

[73] Assignee: International Business Machines Corporation, Armonk, N.Y.

[22] Filed: May 4, 1973

[21] Appl. No.: 357,439

[52] U.S. Cl. ........... 340/173 R, 307/238, 340/172.5

[51] Int. Cl. ........................................... G11c 11/40

[58] Field of Search .................. 340/173 R, 173 VT; 307/238, 279

[56] References Cited

UNITED STATES PATENTS 3,579,204 5/1971 Lincoln .......................... 340/173 R 3,702,990 11/1972 Ross .............................. 340/173 R

*Primary Examiner*—Terrell W. Fears

*Attorney, Agent, or Firm*—Francis J. Thornton

[57] ABSTRACT

A memory array comprising a plurality of nonvolatile, variable threshold storage devices which uses but a single sense amplifier for reading each two adjacent rows of devices in the array together with substrate biasing to selectively control the read, write, and erase operations with a single polarity of voltage, thereby eliminating the need of both positive and negative voltages on the gates of the devices.

11 Claims, 4 Drawing Figures

DOUBLE DENSITY NON-VOLATILE MEMORY ARRAY

BACKGROUND OF THE INVENTION

The present invention relates to memory matrices using non-volatile, variable threshold devices as the memory storage elements. It is known that non-volatile, variable threshold semiconductor field effect transistors, which incorporate memory through the introduction of a two layer gate insulator, can be produced and that these devices can be used as memory storage elements in large capacity random access memories and electronically alterable read only stores.

Typical non-volatile Field Effect Transistors are the metal-nitride-oxide-silicon, MNOS, field effect transistors. These devices have a two-layer gate insulator composed of a layer of silicon dioxide coated with a layer of silicon nitride. This two-layer gate insulator can store charge at the interface between the insulators, which charge storage alters the device theshold voltage, i.e., the voltage that must be applied to the gate to create a channel between the source and drain of the device. Typically, such MNOS type devices have a threshold voltage of about 6 volts when there is no charge stored in the interface and a threshold voltage of about 1 volt when charge is stored therein. Such devices can be put into a low threshold state by applying a large positive voltage to the gate of the device to cause electrons to accumulate at the silicon nitride interface. The electrons so accumulated, remain trapped at this interface when the applied voltage is removed and causes the device to exhibit a low threshold voltage. To erase the charged device, large negative voltages are applied to the gate to drive the electrons from the interface so that the device again exhibits a high threshold voltage.

Such charge accumulation is due to the different conductivities of the nitride and oxide layers and is retained at the interface between these layers when the applied voltage is removed because the current densities in the nitride and oxide layers are non-linear functions of the electric field intensity.

Electronically alterable read only memories are known to the prior art in which the necessary writing voltage has been reduced by isolating each MNOS memory device from any other device by the medium of isolation diffusions held at a reference voltage.

SUMMARY OF THE INVENTION

Broadly speaking, the present invention describes a novel memory array, using non-volatile, variable threshold type transistors in an array organization, that utilizes a read scheme that requires but a single sense amplifier for two adjacent rows of devices. Thus, the number of sense amplifiers required for the array of the present invention is half that required by prior art arrays.

The present invention further can be incorporated in an integrated structure which has a density double that of previous arrangements. This double density is realized by forming non-volatile transistors in a body of semiconductor material so that a single common bit line can serve two adjacent devices.

It is an object of the invention to provide an array in which the write operation is chosen as a transition from a high threshold voltage to a low threshold voltage.

It is also an object of the invention to describe an array in which the substrate is used as a control terminal for bit selection.

It is a further object of the invention to describe an MNOS FET type device having a substrate biased to selectively control the read, write, and erase operations of the device.

It is another object of the present invention to use the memory organization and unique reading, writing, and erasing schemes to eliminate the need for both positive and negative voltages on the gates on the memory devices as required by the prior art. This permits the present invention to halve the large signal swings which which must be tolerated by prior art systems.

It is also still another object of the present invention to permit the use of a substrate bias to erase the device.

These and other features and objects of the present invention will be more fully understood from the accompanying drawings in which:

DETAILED DESCRIPTION OF THE INVENTION

Figure 1:
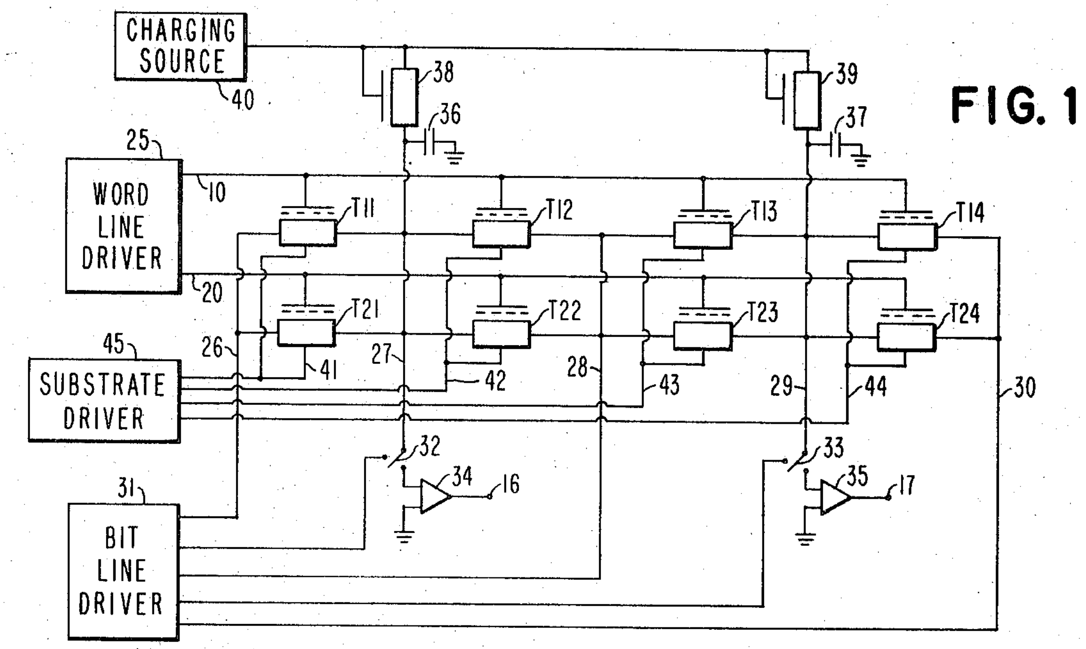
FIG. 1 is a schematic drawing of an array according to the present invention.

FIG. 1 shows schematically a word organized non-volatile memory array according to the present invention which can be used for either an electronically alterable read only memory or a large capacitive random access memory. The organization shown is an array of two words each containing four bits. For purposes of the present description and embodiment, it will be assumed that the non-volatile, variable threshold semiconductor FET's shown on the storage devices utilize P channel operation and have an initial threshold voltage, when no charge is stored at the dielectric interface, of −6 volts and a threshold voltage of approximately −1 volt when the interface contains a charge. In FIG. 1, numerals 10 and 20 denote the two word lines of the array. Of course it should be understood that the array can have any desired number of word lines containing any number of bits therein even though only two word lines, each containing but four bits are shown in this embodiment. Each word line 10 and 20 is coupled to the gates of four transistors each of which stores one bit of the four bit word. For word line 10, the transistors are indicated as T11, T12, T13, and T14. For word line 20, the transistors are indicated as T21, T22, T23, and T24. For purposes of illustration only, the non-volatile, variable threshold characteristic of each device is indicated by the dashed line between the gate and substrate of each device. Each word line 10 and 20 is also coupled to a conventional device 25 which is capable of impressing on each word line selected voltage potentials.

Transistors T11, T12, T13, and T14 in word line 10 and transistors T21, T22, T23, and T24 in word line 20 are organized into four rows for bit selection purposes and source and drain electrodes of each of the transistors in any given row are connected to a respective pair of a plurality of bit lines 26, 27, 28, 29, and 30. Thus, for example, transistors T11 and T21 form one row and have their sources and drains repectively coupled to bit lines 26 and 27, transistors T12 and T22 form a second row and have their sources and drains respectively coupled to bit lines 27 and 28. Transistors T13 and T23 form a third row and their sources and drains are coupled to bit lines 28 and 29 while transistor T14 and T24 form a fourth row and have their sources and drains connected to bit lines 29 and 30. The sources and drains of all transistors in any given row are coupled to the same bit lines while their gates are coupled to different word lines.

In keeping with the concept of the present invention each row of transistors shares in common with the next adjacent rows of transistors an intermediate bit line. Transistors T12 and T22, in the second row, share bit line 27 with transistors T11 and T21, in the first row and share bit line 28 with transistors T13 and T23 in the third row. Bit line 29 is common to the third and fourth row of transistors. Each bit line 26, 27, 28, 29 and 30 is coupled to a conventional bit line driver 31 which is capable of impressing on each bit line selected voltage potentials. Bit lines 27 and 29 are coupled to the bit line driver 31 by respective switches 32 and 33. Each switch 32 and 33 is arranged to decouple its respective bit line 27 and 29 from the bit line driver 31 and connect it to respective outputs 16 and 17 through respective high input impedance voltage sensitive amplifier 34 and 35. Bit line 27 is further connected through a capacitor 36 to ground and through an FET diode 38 to a charging source 40, capable of impressing selected voltage pulses on diode 38. Bit 29 is also connected through a capacitor 37 to ground and through a second FET diode to the same charging source 40.

Because the present invention utilizes substrate biasing of the devices to write information into the array each row of transistors further requires a suitable substrate line common to all the transistors in the respective row. Thus, lines 41, 42, 43, and 44 are the substrate bias lines for the first, second, third, and fourth rows of transistors respectively and are coupled to each transistor in the row and to a substrate driver circuit 45 which is capable of impressing on each row of devices selected voltage potentials.

In describing the operation of the array of FIG. 1, it will be assumed, for purposes of illustration only, that the high threshold voltage; i.e., uncharged state of the non-volatile transistor, will represent a binary 0, and the low threshold voltage; i.e., charged state of the non-volatile transistor, will represent a binary 1. Initially, the entire two-word, eight bit array, shown in FIG. 1, is erased such that the dielectric interface of each transistor in the array is discharged and the transistors all exhibit a high threshold voltage. To erase the entire array, the switches 32 and 33 are set to connect bit lines 27 and 29, respectively, to the bit line driver 31, and each word line 10 and 20 is baised at −20 volts by the word line driver 25, which applies negative voltage pulses 51 and 52 to the respective word lines. The remainder of the array is held at ground, hereinafter referred to as zero volts by the bit line driver 31, the substrate driver 45, and the charging source 40. Thus, all the devices in the array are made to contain binary 0's. Binary 1's are inserted into the array by charging the dielectric interface of selected devices so that the charged devices will exhibit a low threshold voltage.

For purposes of illustration only, it will be assumed that only transistor T11 is to have a 1 written into it. To accomplish this, bit lines 27 and 29 remain connected through switches 32 and 33 to the bit line driver 31 and word line 10, which is connected to the gate of transistor T11, is held at 0 volts while the other word line 20 is biased at −20 volts by word line driver 25 which applies a negative voltage pulse 53 thereto. Simultaneously, all the bit lines 26, 27, 28, 29, and 30 are biased at −17 volts by the bit line driver 31 which applies negative voltage pulses 54, 55, 56, 57, and 58 to the respective bit lines. Also, the substrate of transistors T11 and T21 are biased at −17 volts by the substrate driver 45 which applies a negative pulse 59 to line 41. The remainder of the substrate lines 42, 43, and 44 are held by the same substrate driver 45 at zero volts. The application of these voltages causes charge to be introduced into the dielectric interface of transistor T11, setting it into the low threshold voltage state. Charge becomes introduced into transistor T11 because it alone experiences −17 volts across its gate dielectric. This voltage between the gate of the device and the body of the device causes electrons to be ejected from the substrate of the device into the gate dielectric where they become trapped, reducing the threshold voltage of the device.

The remainder of the devices are not written, either because, for example, transistor T12, their gates and substrates are at the same potential; i.e., zero volts, or because, for example, transistor T21, their gates are more negative than their substrates.

In order to use this write scheme without unintentionally changing the state of some of the memory devices, it is necessary for all the voltages in the array to track within a few volts of one another. Thus, it is necessary that all of the bit lines, word lines, and substrate drivers should be synchronized such that during the first part of the write cycle the voltages of each of these drivers will track with one another.

After the selected devices have been written into; i.e., set in the low threshold state, the array can thereafter be read non-destructively.

Figure 2:
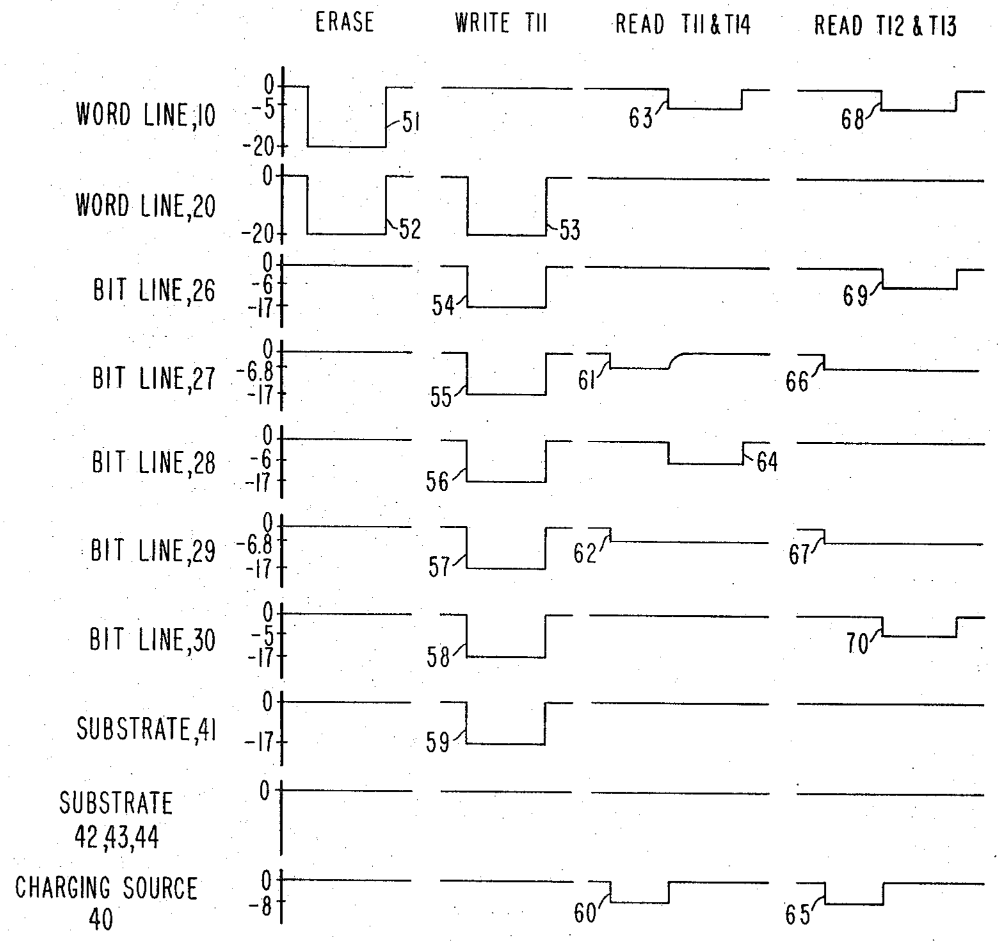
FIG. 2 shows the read, write, and erase waveforms associated with the circuit in FIG. 1.

Because the array of the present invention requires but a single sense amplifier for each two rows of devices in the array, reading of any word line is a two-phase operation. For purposes of illustration only, it will be assumed that word line 10 is to be read. Thus in the first read phase, transistors T11 and T14 will be read, and in the second read phase the remaining transistors T12 and T13 will be read. To read the array, switches 32 and 33 are set to decouple the bit lines 27 and 29 from the bit line driver 31 and connect these bit lines 27 and 29 to the respective sense amplifiers 34 and 35. Once the sense amplifiers 34 and 35 are connected to their respective bit lines, the first read cycle is initiated by applying to FET diodes 38 and 39 from the charging source 40, an 8 volt negative pulse 60. This 8 volt pulse causes the FET diodes 38 and 39 to conduct. As these devices conduct, capacitors 36 and 37 and the bit lines 27 and 29 charge to the level of pulse 60 less the threshold voltage, about 1.2 volts, of the FET diodes 38 and 39. The voltage thus applied to the bit lines 27 and 29 is about −6.8 volts and is shown in FIG. 2 by waveforms 61 and 62 respectively. After a suitable period of time, pulse 60 terminates and simultaneously a −5 volt pulse 63 is applied to word line 10, the word line being read, from word driver 25, and a –6 volt pulse 64 is applied to bit line 28 by bit line driver 31. All other lines are maintained at zero volts.

It is to be noted that the –5 volt pulse applied to the word line 10, being read, is below the threshold voltage of uncharged devices and thus insufficient to turn on uncharged devices but more than sufficient to turn on devices that contain a charge. This low gate voltage applied to the word line is also insufficient to introduce any change in the charge state of the transistors on the word line. Thus, when word line 10 becomes biased at –5 volts, only the charged devices on the word line turn on.

In the described example, only transistor T11 on word line 10 has been charged and thus it alone turns on and creates a conductive path between bit line 27 which is at about –6.8 volts and bit line 26, which is at zero volts. This causes bit line 27 and capacitor 36 to discharge to zero volts as indicated by waveform 61. This indicates that transistor T11 stored a binary 1. Transistor T14 is also coupled between a bit line held at zero volts; i.e., bit line 30 and a charged bit line and capacitor; i.e., bit line 29 and capacitor 37, however, because transistor T14 is in a high threshold state, it does not turn on and no conductive path is created between bit line 30 and bit line 29 so that bit line 29 remains at its charged level of 6.8 volts, as shown by waveform 62. This indicates transistor T14 stored a binary 0. Since the transistors used in the array are nonvolatile devices and since the applied word line voltage was insufficient to affect the charge state of the devices, each device maintains its original charge state at the termination of pulse 63. Because word line 20 was maintained at zero volts the transistors T21, T22, T23, or T24, coupled to it are in no way affected by the application of any voltage to any of the bit lines or substrates.

Because, as noted above, the present invention uses but a single sense amplifier for two adjacent rows of transistors, it is necessary to change the applied voltages on bit lines 26, 28, and 30 in order to read the state of the remaining devices T12 and T13, on word line 10.

This second phase of the read cycle is as follows. The charging source 40 again impresses a voltage pulse 65 –8 volts on FET diodes 38 and 39 to charge up capacitors 36 and 37 and bit lines 27 and 29 as shown by waveforms 66 and 67.

Simultaneously, with the termination of pulse 65 a –5 volt pulse 68 is applied to word line 10 and –6 volt pulses 69 and 70 are applied to bit line 26 and bit line 30 respectively. Bit line 28, word line 20, and all the substrate lines are held at zero volts. In this case, however, both transistors T12 and T13 are uncharged and do not turn on, thus they do not affect the level of the voltage on bit lines 27 or 29. Although pulse 68 on word line 10 does cause transistor T11, the charged device, to turn on, it connects bit line 26, which is at –6 volts, to bit line 27, which is at –6.8 volts. Thus, bit line 27 remains substantially unchanged. The retention of this voltage on lines 27 and 29 indicates that both transistors T12 and T13 are in high threshold state and are storing binary 0's.

Under some circumstances, the bit lines 27 and 29, biased by charging source 40, may contain sufficiently large enough parasitic capacitance such that capacitors 36 and 37 may be eliminated. In such a case, the array would still be erased, written, and read as described above.

In the case where both transistors sharing the common bit line, are in the low threshold voltage state, the waveform indicating such a low threshold state on the device being read does not return completely to zero as does waveform 61 shown in FIG. 2.

Instead, in such a case, the waveform will indicate a very slight residual voltage of less than 1 volt remaining on the common bit line because the device not being read is in the saturation mode which causes a low level voltage of less than 1 volt to be constantly maintained on the bit line common to the two devices.

Figure 3:
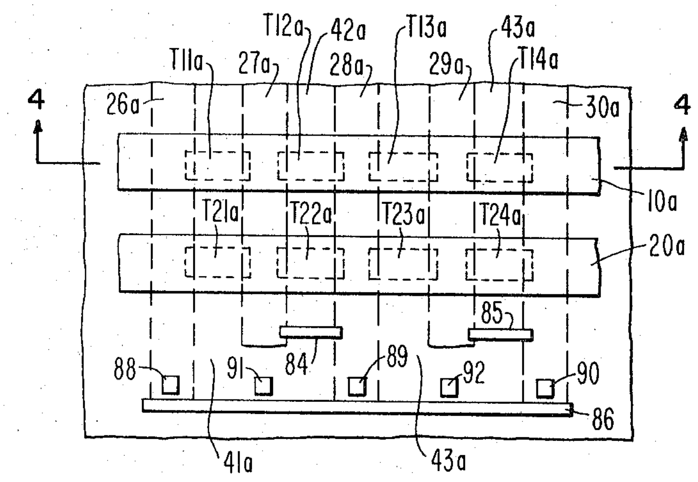
FIG. 3 is a plan view of an integrated form of the array.
Figure 4:
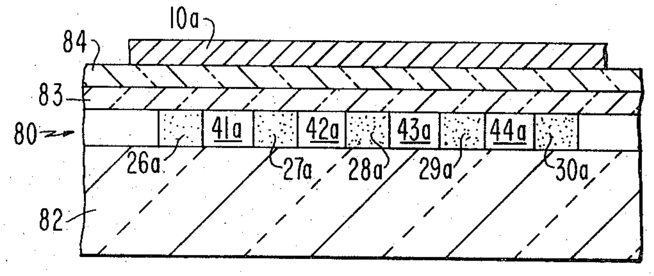
FIG. 4 is a sectional view of the integrated array shown in FIG. 3.

Referring once again to the drawings, FIGS. 3 and 4 show an embodiment of the semiconductor storage array of the present invention, as it could be produced in integrated form. For purposes of illustration only, the peripheral devices such as FET diodes 38 and 39, and the driver circuit switches or sense amplifiers, are not shown. In the Figure, a body of N type epitaxial material 80 is deposited on an insulating base 82; e.g., sapphire. The epitaxial layer 80 has diffused therein a series of P type diffusions 26*a*, 27*a*, 28*a*, 29*a*, and 30*a* that extend through layer 80 to base 82 to isolate, in the layer 80, a number of parallel regions 41*a*, 42*a*, 43*a*, and 44*a*. Overlying the epitaxial layer 80 and the diffusions 41*a*, 42*a*, 43*a*, and 44*a* is an insulating layer 83 which may be formed, for example, of silicon dioxide having a thickness of approximately 30 angstroms. Disposed on the surface of this silicon dioxide layer 83 is a second layer 84 of insulating material having a dielectric different from the underlying silicon dioxide. This second layer may be, for example, silicon nitride or aluminum oxide. A series of metallic lines 10*a* and 20*a* are disposed over the surface of the second dielectric layer 84. Each metallic line 10*a* and 20*a*, in conjunction with any adjacent pair of the P diffusions 26*a*, 27*a*, 28*a*, 29*a*, and 30*a* forms a non-volatile field effect transistor.

In FIG. 3, these transistors are illustrated as the dotted squares under the metallic lines 10*a* and 20*a*. Effectively, under metallic line 10*a* is transistor T11*a* between diffusions 26*a* and 27*a*, transistor T12*a* between diffusions 27*a* and 28*a*, transistor T13*a* between diffusions 28*a* and 29*a*, and transistor T14 between diffusions 29*a* and 30*a*. Transistors T21*a*, T22*a*, T23*a*, and T24*a* exist in similar positions under metallic line 20*a*.

The integrated form of the array shown in FIGS. 3 and 4 is operated identically to that shown in FIG. 1. Thus, diffusions 26*a*, 27*a*, 28*a*, 29*a*, and 30*a* serve as the bit lines and would be coupled to a bit line driver as shown in FIG. 1, metallic lines 10*a* and 20*a* would serve as the word lines and be connected to a word line driver, and regions 41*a*, 42*a*, 43*a*, and 44*a* would serve as the substrate and be connectable to a substrate driver.

This structure is unique compared with previous nonvolatile, variable threshold device arrays because transistors are formed between each pair of diffusions and each row of devices share a common substrate that is isolated from any other substrate.

The end of each substrate region and the end of each diffused bit line may be contacted and isolated from one another as necessary by suitable oxidation isolation moats that extend down through layer 80 to the underlying insulating base 82. As shown in FIG. 3, moat 84 isolates region 42*a*, moat 85 isolates 44*a*, and moat 86 isolates and terminates all the diffusions 26*a*, 27*a*, 28*a*, 29*a*, and 30*a* as well as substrate regions 41*a* and 43*a* from the remainder of the layer 80. Contact pads 88, 89, and 90 are provided for making electrical connections to the diffusions 26*a*, 28*a*, and 30*a* respectively and contact pads 91 and 92 are provided for contacting substrate regions 41*a* and 42*a* respectively. Diffusions 27*a* and 29*a* and substrate regions 42*a* and 44*a* will be contacted by a similar arrangement of moats at the opposite end of the array.

While the invention has been particularly shown and described with reference to the preferred embodiment thereof, it will be understood by those skilled in the art that various changes in form and details of the apparatus and method may be made therein without departing from the spirit and scope of the invention and that the method is in no way restricted by the apparatus.

What is claimed is:

1. A memory array comprising a pair of voltage driven devices serially coupled together at a common point, each of said pair of devices exhibiting above a first drive voltage level a stable low impedance and at a second drive voltage level can alternately exhibit a stable high impedance and a stable low impedance, means coupled to said common point for setting a selected voltage on said common point, means for impressing said selected voltage across a first one of said pair of devices, means for applying said second drive voltage to both of said devices, and means coupled to said common point for sensing the impedance state of said first one of said pair of devices.

2. The memory array of claim 1 wherein there is further provided means for removing said selected voltage from across said first one of said pair of devices and impressing said selected voltage across said second one of said pair of devices.

3. The memory array of claim 1 wherein said devices comprise non-volatile, variable threshold semiconductor devices.

4. The memory array of claim 3 wherein said devices comprise field effect transistors.

5. The memory array of claim 1 wherein there is further provided means for setting selected voltage levels on said devices to set the impedance state of said devices at said second drive voltage level.

6. A memory array comprising a plurality of variable threshold voltage field effect transistors arranged in a plurality of rows and word lines, each transistor having a source, drain gate electrode, and a substrate and each being capable of assuming two threshold levels, the transistor in each row being connected by their source and drain electrodes between a pair of bit lines, each bit line of said pair of bit lines being connected to and serving as a common bit line for the transistors in an adjacent row, each word line being coupled to the gate of but one transistor in each row, word driver circuit means coupled to the word lines for setting one of several voltages of said word lines, substrate driver circuit means coupled to substrates of said transistors for setting one of several voltages on the substrates of the devices in each row, bit line driver circuit means for setting one of several voltages on the bit lines, a plurality of means for sensing the impedance state of selected transistors in a row, a plurality of switch means, one in each alternate one of said common bit lines for alternately connecting each alternate one of said common bit lines to the bit line driver circuit means and to one of said plurality of means for sensing the impedance state, and means for impressing a voltage on each alternate one of said common bit lines.

7. The array of claim 6 wherein said means for impressing a voltage on each alternate one of said common bit lines comprises a capacitor coupled between said bit line and ground and a charging source coupled to said bit line by a diode.

8. A non-volatile, variable threshold memory array comprising an insulating crystalline body, a layer of semiconductor material for a first conductivity type on said body having a selected thickness, spaced stripes of a second conductivity type material in said layer extending through said selected thickness to contact said body, a chargeable insulation layer overlying said semiconductor layer and said spaced strips, a plurality of spaced conductive lines on said charge insulation layer orthogonal to said strips, means coupled to said semiconductor layer for applying selected voltages to said semiconductor layer, means coupled to said spaced strips for applying selected voltages to said strips, and means coupled to said spaced conductive lines for applying selected voltages to said lines.

9. The array of claim 7 wherein said spaced strips penetrate through said layer of semiconductor material and contact both the insulating body and the insulating layer and there is further provided means of electrically isolating regions of said layer between said strips one from each other and from the remainder of said layer.

10. A monolithic memory array comprising an insulating crystalline body, a semiconductor layer of a selected thickness on said body, spaced strips of a first conductivity type in said layer to form a plurality of bit lines extending through the semiconductor layer, spaced strips of a second conductivity type extending through the entire thickness of said semiconductor layer to contact said insulating crystalline layer to electrically isolate said first strips from one another, a chargeable insulation layer overlying said semiconductor layer, a plurality of parallel spaced and conductive word lines arranged orthogonal to said bit lines, means for applying a voltage to said strips of said first conductivity type, means for applying a voltage to said strips of said second conductivity type, means for applying a voltage to said word lines to store information in said chargeable insulation layer under said word lines, and means for reading the information stored in said charged array.

11. The memory array of claim 1 wherein there is further provided a second pair of voltage driven devices coupled together at a second common point and arranged in parallel to said first pair.

* * * * *